Oct. 10, 1950  F. E. ERICSON ET AL  2,525,068
RADIAL CLEARANCE GAUGE
Filed Aug. 7, 1946  2 Sheets-Sheet 2
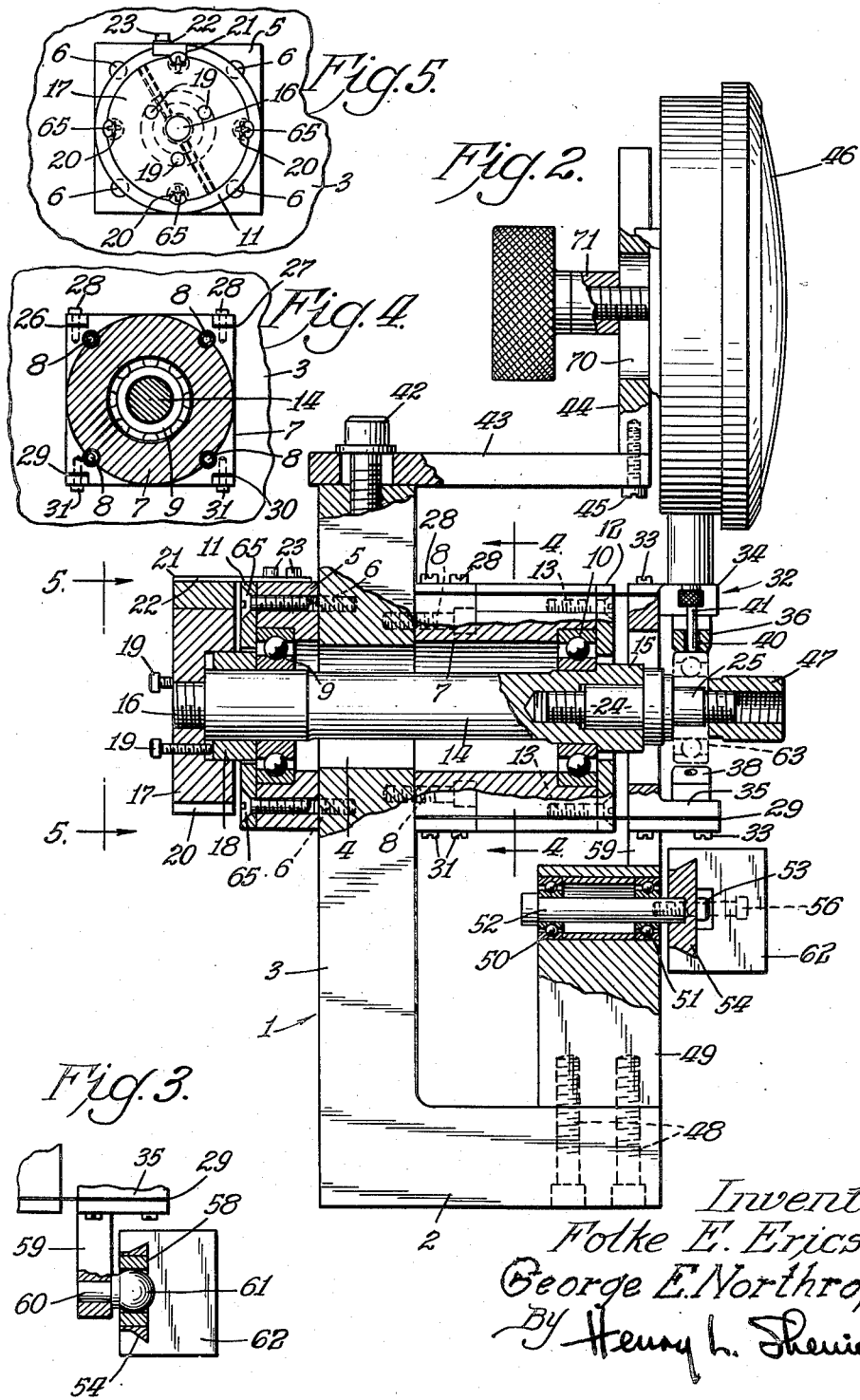
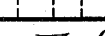
Inventors:
Folke E. Ericson
George E. Northrop, jr.
By Henry L. Chenier
Atty.

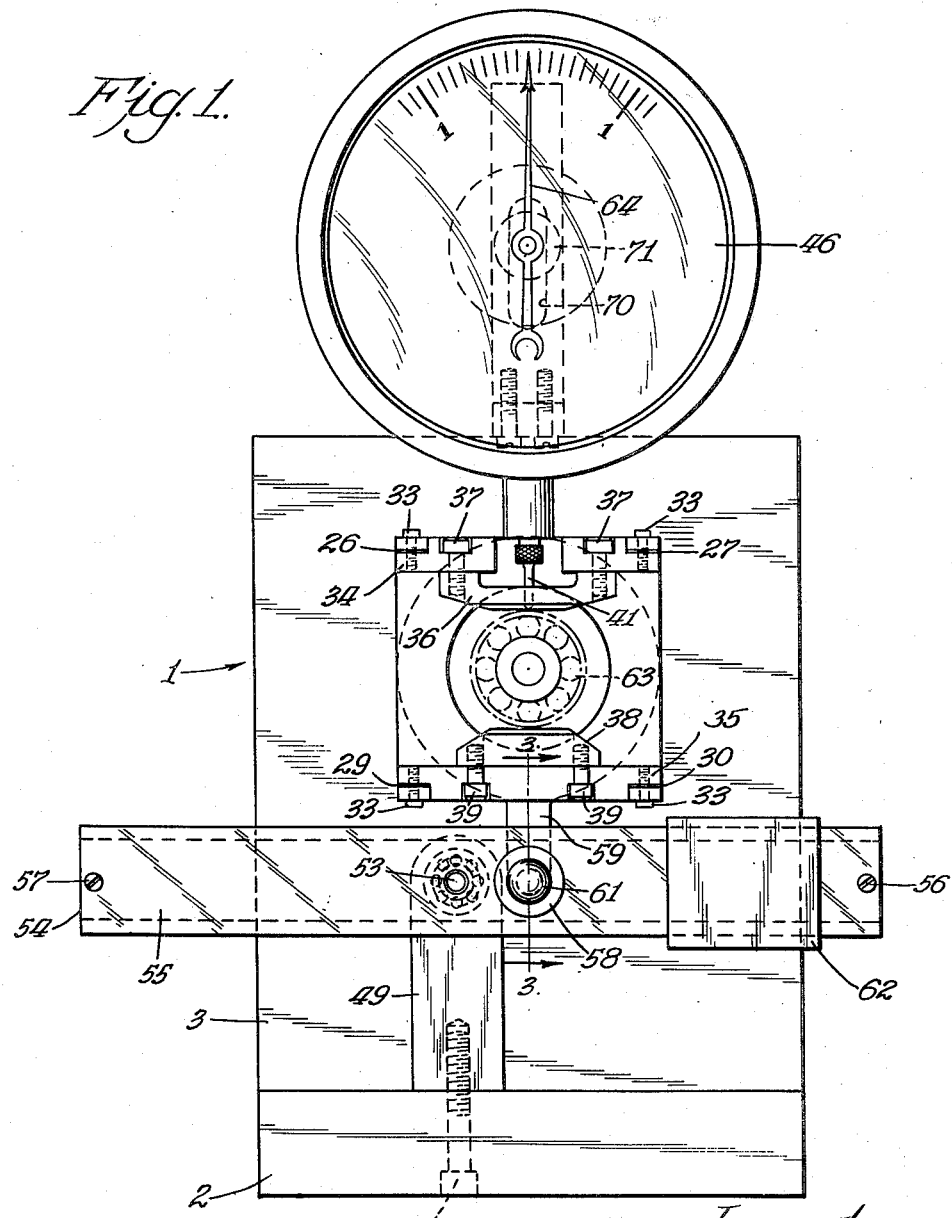

Patented Oct. 10, 1950

2,525,068

UNITED STATES PATENT OFFICE 2,525,068

RADIAL CLEARANCE GAUGE

Folke E. Ericson, Danbury, and George E. Northrop, Jr., Stamford, Conn., assignors to The Barden Corporation, Danbury, Conn., a corporation of Connecticut Application August 7, 1946, Serial No. 688,890

8 Claims. (Cl. 33—174)

Our invention relates to radial clearance gauges, and more particularly to a new and improved gauge for measuring the radial play in ball bearings to a high degree of accuracy.

In the matching of ball bearings particularly those of small sizes, it is exceedingly difficult to select the inner race groove diameter, the outer race groove diameter, and the balls to provide for the proper radial clearance. Heretofore it has been customary to determine radial clearance indirectly from a measurement of the axial play. Radial play is determined mathematically, since there is usually a relationship between radial play and axial play which depends upon the size of the bearings and the shape of the race grooves. Specifications for ball bearings usually provide a limit for radial play. For example, a specification may read:

"The bearings shall have a radial clearance so that the axial play under a three pound load will not be more than .003 inch."

The disadvantage of determining radial clearance from the axial play will be manifest if one will consider that groove curvatures vary. With the variation of groove curvatures the axial measurement is not an accurate criterion for radial clearance.

In the manufacture of precision ball bearings for use in gyroscopes, fire control instruments, flux gate compasses, and scientific instruments, radial play is a highly important factor and in a good bearing this must be kept to a minimum.

One object of our invention is to provide a new and improved gauge for measuring radial clearance to a high degree of accuracy.

Another object of our invention is to provide a simple, sturdy, and accurate gauge in which radial play may be measured rapidly, conveniently, and expeditiously, and in such a manner as to obtain extremely accurate readings for radial fits repetitively.

Another object of our invention is to provide a novel radial play gauge in which the movement between the inner and outer races of a bearing is measured directly.

Other and further objects of our invention will appear from the following description.

In the accompanying drawings, which form part of the instant specification and which are to be read in conjunction therewith, and in which like reference numerals are used to indicate like parts in the various views;

Fig. 1 is a front elevation of a radial play gauge showing one embodiment of our invention.

Fig. 2 is a side elevation of the radial play gauge shown in Fig. 1, with parts broken away.

Fig. 3 is a fragmentary sectional view taken on the line 3—3 of Fig. 1.

Fig. 4 is a fragmentary sectional view taken on the line 4—4 of Fig. 2.

Fig. 5 is a fragmentary rear elevation taken along the line 5—5 of Fig. 2.

Referring now to the drawings, the gauge is mounted on a support indicated generally by the reference numeral 1, having a horizontally extending base portion 2 and a vertically extending supporting plate 3 formed integrally therewith. An opening 4 is formed in the supporting plate 3, as can readily be seen by reference to Fig. 2. A member 5 is secured to the back of plate 3 surrounding the opening 4 by machine screws 6. A hollow member 7 is secured to the front side of the plate 3 adjacent the opening 4 by means of machine screws 8. Supported by the member 5 we provide a ball bearing indicated generally by the reference numeral 9. A ball bearing indicated generally by the reference numeral 10 is supported by the hollow member 7. A plate 11 holds the outer race of the bearing 9 firmly in position, the plate 11 being secured by the screws 65. A plate 12 secured to the end of hollow member 7 by machine screws 13 holds the outer race of the bearing 10 in position. Rotatably supported by the bearings 9 and 10 we provide a shaft 14. The front end of the shaft 14 is formed with a collar 15 adapted to engage the inner race of bearing 10. The rear end of shaft 14 is threaded at 16 and adapted to threadedly engage a member 17. A bushing 18 is carried by the shaft and is adapted to contact the inner race of bearing 9. A plurality of screws 19 carried by the member 17 are adapted to engage the bushing 18. The turning of screws 19 draws the shaft 14 to the left, tending to move the inner race of bearing 10 toward the inner race of bearing 9. This places a heavy pre-load on the bearings 9 and 10 to eliminate any play in these bearings. The member 17 is provided with a plurality of re-entrant portions 20 adapted to receive the end 21 of a spring 22 secured to the member 5 by screws 23. The front end of the shaft 14 is internally threaded to receive a stud 24. The stud 24 has a forward portion 25 of the correct dimension to receive the inner race of the bearing 63 to be tested. A plurality of studs 24 are provided, each with a portion 25 of different dimension so that our gauge can be used to measure the radial play in any suitable number of bearings. A pair of strip springs 26 and 27 are secured to the upper portion of member 7 by screws 28, as can readily be seen by reference to Figs. 1 and 4. A similar pair of strip springs 29 and 30, which may be made of beryllium copper or the like, are secured to the lower portion of member 7 by screws 31. The strip springs are disposed horizontally so as to permit movement directly upwardly and directly downwardly, and yet present a rigid construction to lateral movement. The outer ends of the strip springs 26, 27, 29, and 30 are secured to an anvil 32 by means of screws 33, as can readily be seen by reference to Figs. 1 and 2. The anvil 32 may be of any suitable shape. As shown it is provided with an upper forwardly directed flange 34 and a lower forwardly directed flange 35. An upper contact member 36 is secured to the upper flange 34 by means of screws 37. A lower contact member 38 is secured to the lower flange 35 by means of screws 39. The upper contact member 36 is provided with an opening 40 for passage of a gauge actuating member 41.

Secured to the upper portion of the plate 3 by means of screw 42 is a supporting arm 43 which carries a plate 44 secured through screws 45. Supported by the plate 44 in any suitable manner is an indicator gauge 46 actuated through contact member 41. As shown, the arm 44 is provided with a slot 60 so that by loosening nut 71 the gauge may be adjusted upwardly and downwardly. The indicator shown is a dial indicator well known to the art. Any suitable indicator, such as an electronic indicator or the like, may be employed.

The bearing 63 to be tested is adapted to be supported by the stud 25, the inner race being supported thereby. A clamping nut 47 clamps the inner race securely to the stud. The distance between upper contact member 36 and lower contact member 38 is sufficiently great to permit the outer race to pass freely between them. The contact member 41 of the gauge is adapted to rest against the outer race.

Secured to the base member 2 by means of screws 48 we provide a standard 49. The standard supports bearings 50 and 51 in which is journaled a shaft 52. Secured to the shaft 52 by means of screw 53 we provide an arm 54. The front surface 55 of the arm 54 is of greater width than the rear surface. The arm 54 is adapted to slidably support a weight 62. Screws 56 and 57 act as stops to prevent the weight from sliding free of the arm. Adjacent the shaft 52 the arm is recessed and provided with a bushing 58. The anvil 32 is formed with a depending portion 59 which carries a pin 60 formed with an outer ball 61. The ball is adapted to seat in the bushing 58 and forms a connection between the arm and the anvil. When the weight 62 is positioned to the right, as viewed in Fig. 1, the arm 54 will tend to rotate in a clockwise direction, moving the anvil downwardly so that contact member 36 will press downwardly against the outer race of the bearing to be tested. When the weight 62 is to the left adjacent the stop screw 57, the arm 54 will tend to rotate in a counterclockwise direction, moving the anvil upwardly and bringing the lower thrust member 38 against the lower portion of the outer race of the bearing to be tested.

In using our gauge, the balls must bottom in their tracks. If the balls hang or ride on the sides of the groove an incorrect reading might easily be obtained and a bearing which is presumably tight may be looser than it would appear due to this condition. To eliminate the possibility of an incorrect reading it is necessary to oscillate the inner race with respect to the outer race or set the entire unit in a vibrating device. In our construction the inner race is adapted to be rotated since the inner race is clamped to the shaft 14 which is rotatably mounted in bearings 9 and 10. The outer race must if necessary shift so that it is directly opposite the ball path of the inner race. We accomplish this by having line contact of the load transmitting members 36 and 38 through which the load is imposed. This line contact permits the outer race to shift axially or to swing slightly when either is necessary.

In use, a bearing 63 to be tested is positioned over stud 25 and clamped to the stud by nut 47. The inner race is thus securely held to the shaft 14 which is supported from the plate 3. The indicator 46 is likewise securely supported from the same plate 3. The weight 62 is moved to the right, as viewed in Fig. 1, thus pulling the anvil 32 downwardly, permitting the upper thrust member 36 to contact the outer race of the bearing to be tested. By means of the nut 47 the shaft 14 is rotated. In the construction shown there are four re-entrant portions 20 on member 17 so that four clicks will indicate a complete revolution. The rotation of the inner race with respect to the outer race with a downward load insures that the balls are bottomed in their grooves. The indicator needle 64 is observed during this operation. In the drawing the figure "1" indicates a deviation of .0001 inch so that each subdivision represents .00001 inch. Let us assume during the testing of the bearing with the weight shown to the right, as viewed in Fig. 1, that the pointer 64 indicated a play of .00007 inch. The weight is then shifted to the left, as viewed in Fig. 1, and the inner race again rotated with respect to the outer race. During this rotation the indicator is again observed and the reading is not necessarily the same but is in the opposite direction. The second reading is then added to the first reading and the sum of the two readings gives the entire radial play of the bearings being tested.

It will be seen that we have accomplished the objects of our invention. We have provided a radial clearance gauge for measuring radial play of bearings in an accurate, simple, and expeditious manner. We are enabled to obtain extremely accurate readings for radial fits with comparatively light radial loads. For small bearings, the weight 62 is such that a radial thrust of about one pound may be employed. For larger bearings, heavier weights may be used with a plurality of sizes of bearings by the provision of a plurality of studs 24. The distance between contact members 36 and 38 is not critical since the measurement is taken directly on the outer race. The suspension of the anvil is such that ready movement in a vertical direction may take place while presenting rigidity to lateral movement. The mounting of the rotatable shaft supporting the inner race is such that no radial play in its bearings exists.

It will be understood that certain features and sub-combinations are of utility and may be employed without reference to other features and sub-combinations. This is contemplated by and is within the scope of the claims. It is further obvious that various changes may be made in details within the scope of the claims without departing from the spirit of the invention. It is, therefore, to be understood that this invention is not to be limited to the specific details shown and described.

Having thus described our invention we claim:

1. A gauge for measuring the radial clearance of a bearing assembly including in combination, a support, bearings carried by said support, a shaft journaled in said bearings adapted to receive the inner race of a bearing to be tested, means for loading said bearings to remove radial play therefrom, an anvil adapted to contact the outer race of a bearing to be tested, means for mounting said anvil adjacent said bearing for movement in a direction radially of said bearing, an indicator having a contact member responsive to displacement, means for mounting said indicator on said support with said contact member in contact with the outer race of the bearing to be tested, and means for imparting thrust to said anvil.

2. A gauge for measuring the radial clearance of a bearing assembly including in combination, a support, a pair of bearings carried by said support, a shaft journaled in said bearings, a stud carried by said shaft adapted to receive the inner race of a bearing to be tested, means for loading said shaft bearings to remove radial play therefrom, an anvil, means for mounting said anvil from said support adjacent the bearing to be tested for movement in a direction radially of the bearing to be tested, said anvil having oppositely disposed portions thereof adapted to contact diametrically opposite portions of the outer race of the bearing to be tested, an indicator having a contact member responsive to displacement, means for mounting said indicator on said support with said contact member in contact with the outer race of the bearing to be tested, and means for imparting thrust to said anvil.

3. A gauge for measuring the radial clearance of a bearing assembly including in combination, a support, a shaft journaled in said support, said shaft having means adapted to support the inner race of a bearing to be tested, an anvil adapted to contact the outer race of the bearing to be tested at diametrically opposite areas thereof, a plurality of resilient strips carried by said support adjacent one of their respective ends, said strips being disposed in planes parallel to a plane passing through the axis of the bearing to be tested, means for securing said anvil to the respective other ends of said strips whereby said anvil is mounted for movement in a direction radially of the bearing to be tested, an indicator having a contact member responsive to displacement, means for mounting said indicator on said support with said contact member in contact with the outer race of the bearing to be tested, means for imparting thrust to said anvil in diametrically opposite directions and means for rotating the inner race relative to the outer race during the application of thrust.

4. A gauge as in claim 3 in which said means for imparting thrust to said anvil comprises an arm, means for mounting said arm for rotation from said support, means for connecting said anvil to said arm at a point displaced from the axis of rotation of said arm, and a weight slidable upon said arm to positions on opposite sides of the axis of rotation.

5. A gauge as in claim 3 in which said shaft is mounted in bearings, said bearings being carried by said support, and means for pre-loading said bearings to eliminate radial play therefrom.

6. A gauge as in claim 3 in which said anvil is formed with an opening, said indicator contact member being positioned in said opening.

7. A gauge as in claim 3 in which said shaft is journaled in bearings, said bearings being carried by said support, one end of said shaft being formed removably to receive a stud adapted to support the inner race of the bearing to be tested, the other end of said shaft carrying a plate, and means carried by said plate adapted to load said shaft bearings to remove radial play therefrom.

8. A gauge as in claim 3 in which said shaft is journaled in bearings, said bearings being carried by said support, one end of said shaft being formed removably to receive a stud adapted to support the inner race of the bearing to be tested, the other end of said shaft carrying a plate, means carried by said plate adapted to load said shaft bearings to remove radial play therefrom, and a detent cooperating with said plate.

FOLKE E. ERICSON.
GEORGE E. NORTHROP, Jr.

REFERENCES CITED

The following references are of record in the file of this patent:

UNITED STATES PATENTS

| Number | Name | Date |
|---|---|---|
| 2,177,399 | Aller | Oct. 24, 1939 |
| 2,197,198 | Street | Apr. 16, 1940 |
| 2,210,560 | Allen | Aug. 6, 1940 |
| 2,408,689 | Seme | Oct. 1, 1946 |
| 2,419,280 | Neff | Apr. 22, 1947 |
| 2,427,152 | Moore | Sept. 9, 1947 |
| 2,468,875 | Henrikson | May 3, 1949 |